E. W. MARVEL.
CHANGEABLE COMBINATION KEY LOCK.
APPLICATION FILED FEB. 10, 1913.
1,145,870.
Patented July 6, 1915.
4 SHEETS—SHEET 1.
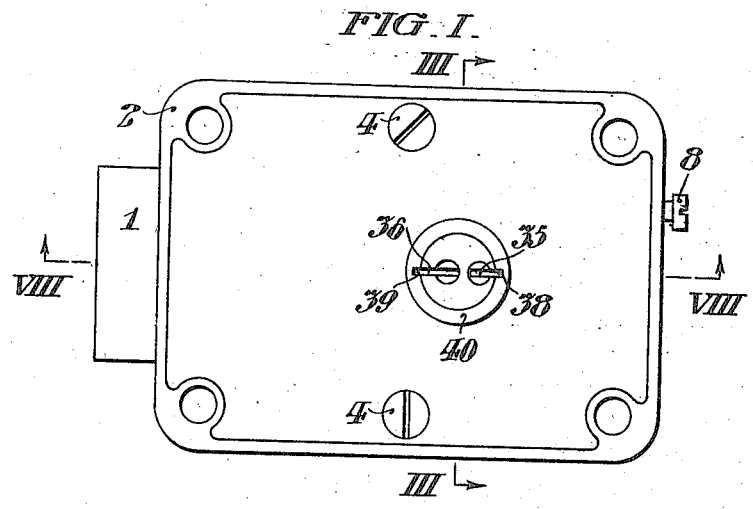
FIG. I.
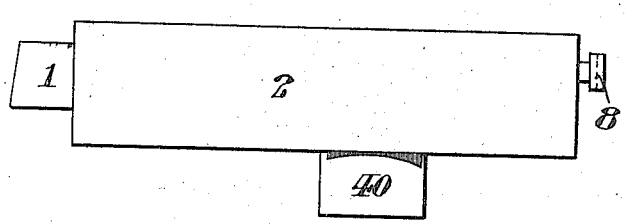
FIG. II.
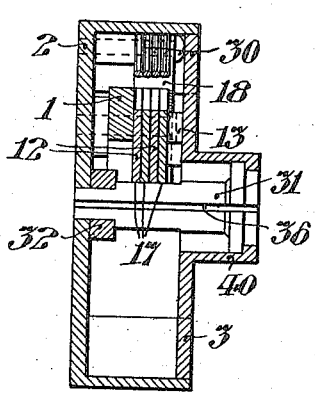
FIG. III.
WITNESSES:
Philip W. Vessey
James McCabe
INVENTOR:
Edward Willey Marvel
by Arthur E. Paige
Attorney.

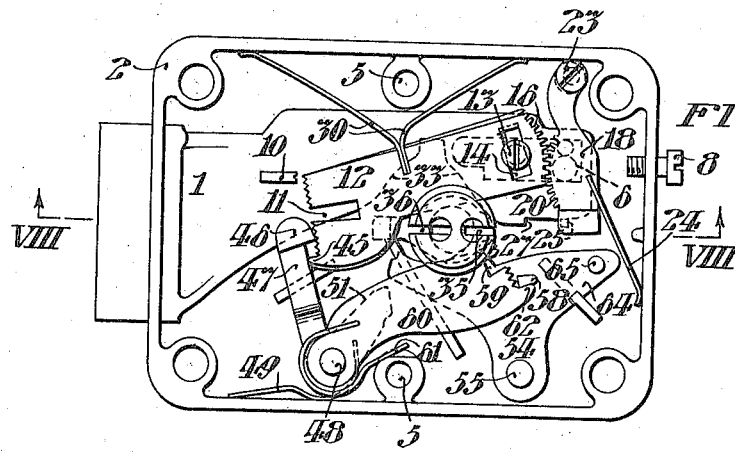
FIG. IV.
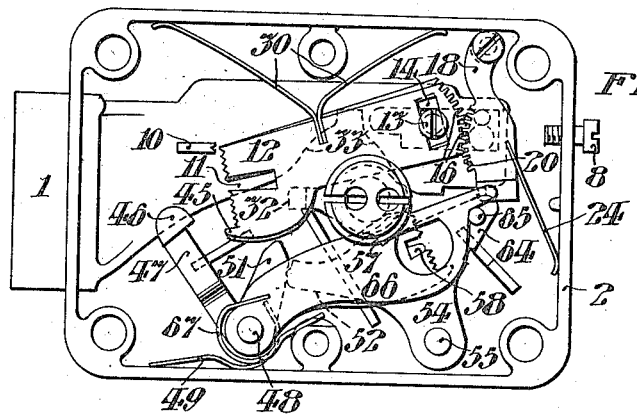
FIG. V.
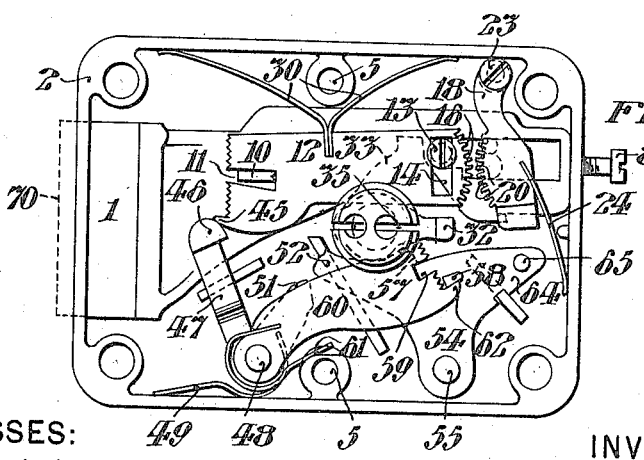
FIG. VI.

E. W. MARVEL.
CHANGEABLE COMBINATION KEY LOCK.
APPLICATION FILED FEB. 10, 1913.
1,145,870.
Patented July 6, 1915.
4 SHEETS—SHEET 3.
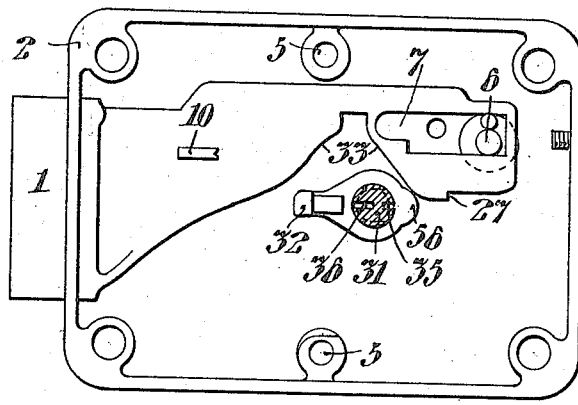
FIG. VII.
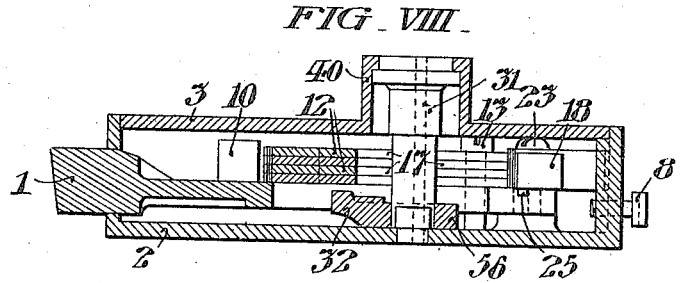
FIG. VIII.
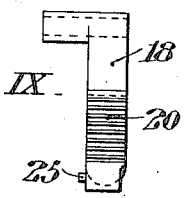
FIG. IX.
FIG. XI.
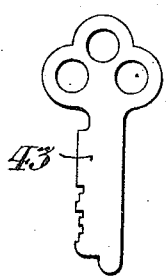
FIG. X.
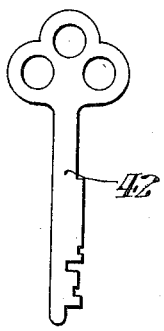
FIG. XII.
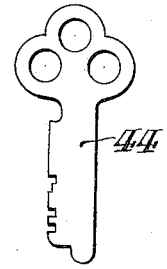
WITNESSES:
Philip W. Vessey.
James M. Cab[?]
INVENTOR:
Edward Willey Marvel,
by Arthur E. Paige,
Attorney.

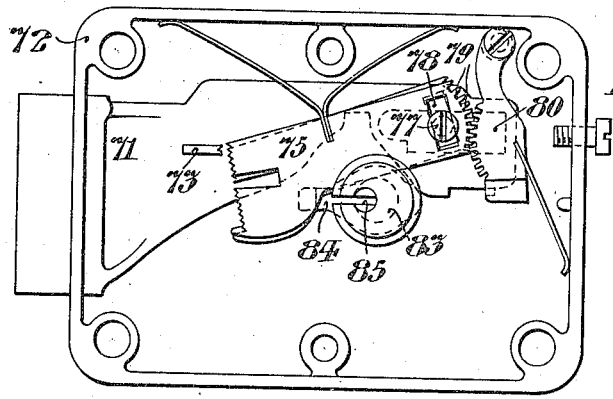
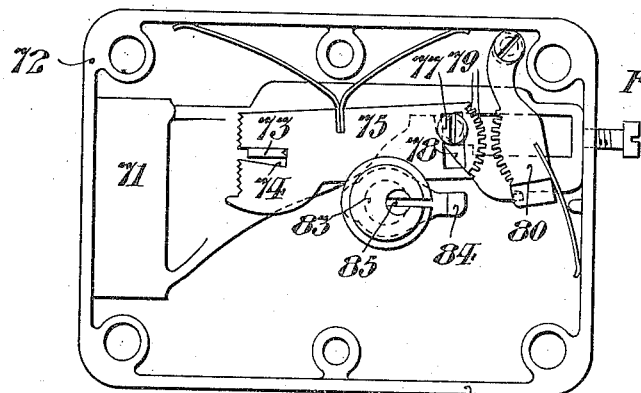
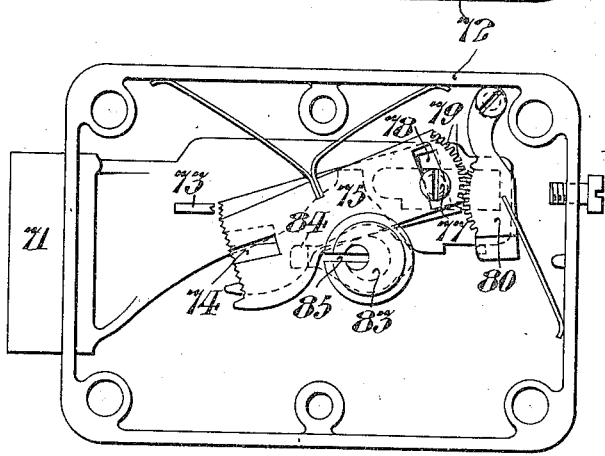

UNITED STATES PATENT OFFICE.

EDWARD WILLEY MARVEL, OF PHILADELPHIA, PENNSYLVANIA, ASSIGNOR TO WILLIAM H. HOLLAR, OF PHILADELPHIA, PENNSYLVANIA.

CHANGEABLE-COMBINATION KEY-LOCK.

1,145,870.  Specification of Letters Patent.  Patented July 6, 1915.

Application filed February 10, 1913. Serial No. 747,352.

*To all whom it may concern:*

Be it known that I, EDWARD WILLEY MARVEL, a citizen of the United States, and resident of Philadelphia, in the State of Pennsylvania, have invented a certain new and useful Improvement in Changeable-Combination Key-Locks, whereof the following is a specification, reference being had to the accompanying drawings.

My invention relates to locks adapted for use in connection with safety deposit boxes and similar inclosures, and may be employed with particular advantage in locks requiring the use of two different keys, to wit, a guard key and a main key, to effect each opening movement of the lock.

Safety deposit boxes being successively leased to different parties to whom the lessor furnishes a main key adapted to open a given box when the lock thereof is partially operated by a guard key in the possession of the lessor; the lessees sometimes fail to return the main keys at the expiration of their leases and it is necessary to change the locks before again leasing them, in order to render the boxes secure against unauthorized use. Moreover, even if the lessees return the main keys at the expiration of their leases, it is desirable to change the locks whenever the lessees of the boxes are changed, to prevent the otherwise possible use of unauthorized duplicates of the keys which have been returned.

Therefore, it is the object of my invention to provide such a lock with means whereby the combination controlled by the main key may be readily changed without removing the lock or otherwise disturbing its mechanism, and while it remains subject to operation by the same guard key.

As hereinafter described, my invention includes a series of counterpart pivoted main tumblers, subject to operation by main keys, each of said tumblers having a sectoral series of gear teeth at its pivoted end and being independently adjustable to different positions of pivotal engagement with respect to a pivoted fence having a sectoral series of gear teeth arranged to mesh with the gear teeth on all of said tumblers; said fence having movable means normally holding it in operative position, but said fence being adapted to be disengaged by abnormal retraction of the lock bolt, so that when said fence is disengaged any one of a series of suitable main keys may be inserted and turned to sweep the main tumblers into coöperative adjustment with respect thereto and said fence be reëngaged with said tumblers and thereafter remain subject to operation by said main key until again changed.

My invention includes the various novel features of construction and arrangement hereinafter more definitely specified.

In the drawings:—Figure I is an outer face view of a lock conveniently embodying my improvement. Fig. II is a plan view of said lock. Fig. III is a vertical sectional view of the lock, taken on the line III, III in Fig. I. Fig. IV is a view similar to Fig. I but with the casing front plate removed to show the lock mechanism in normal position, requiring two keys, to wit, a guard key and a main key, to unlock it. Fig. V is a view similar to Fig. IV but showing the lock mechanism as set, by the guard key, to permit its operation by the main key. Fig. VI is a view similar to Figs. IV and V but with the lock mechanism shifted into unlocked position by the main key, the abutment screw, which normally prevents the fence from being disengaged, being withdrawn so that the slide bolt is abnormally retracted and said fence disengaged. Fig. VII is a view similar to Fig. IV but with both tumbler mechanisms omitted. Fig. VIII is an inverted plan sectional view of said lock taken on the line VIII, VIII in Figs. I and IV. Fig. IX is an elevation of the fence as seen from the left hand side of Fig. IV. Fig. X is an elevation of the guard key. Figs. XI and XII show main keys having respectively different bittings, which the main tumbler mechanism may be changed to fit. Figs. XIII to XV show a simplified form of my invention; Fig. XIII being a view similar to Fig. IV; Fig. XIV being a view similar to Fig. VI, and Fig. XV being a view similar to Fig. XIII but with the main tumblers changed to fit a different main key.

Referring to the form of my invention shown in Figs. I to XII inclusive; 1 is the lock bolt which is fitted to slide in the lock casing 2 having the cover 3 removably secured by the screws 4 in threaded engagement with the sockets 5 in said casing. Said bolt 1 slides on the stationary bearing 6 which extends through the slot 7 in said bolt; the outward locking movement of the latter being limited by said bearing 6 and the inward unlocking movement thereof being normally limited by the adjustable abutment screw 8. Said bolt 1 carries the stump 10 fitted to enter the gatings 11 of the main tumblers 12 which are loosely supported on the stationary screw stud 13 extending through their slots 14. Said tumblers 12 are all the same shape and each is provided with a sectoral series of gear teeth 16 at its pivoted end and each is independently adjustable at that end to change the combination, by shifting the axes of oscillation of said tumblers with respect to the key sweep edges 17 thereof, and with respect to the casing 2; said gear teeth 16 serving as pivotal members to engage the fence 18 which has similar pivotal members, to wit, the sectoral series of gear teeth 20 which are arranged to mesh with said gear teeth 16 on all of said tumblers, in different positions of the latter. Said fence 18, being pivoted on the stud 23 which is stationary in said casing 2, has the spring 24 comprising resilient means normally holding said fence in operative position. However, said fence 18 has the projection 25 extending in position to be encountered by the shoulder 27 on said slide bolt 1 so that when the latter is abnormally retracted as shown in Fig. VI said fence is disengaged from said tumblers 12 to permit the latter to be changed, by changing the pivotal connections thereof. Each of said tumblers 12 has a spring 30, bearing at its free ends upon said casing 2 and tending to thrust said tumblers downward to the position shown in Figs. IV, V and VI, with the key sweep edges 17 thereof bearing upon the rotary key hub 31 which is journaled in said casing 2 and cover 3 as shown in Fig. VIII and provided with the cam 32 which turns in the recess 33 of said slide bolt 1 so as to shift the latter back and forth when said hub is turned. Said hub has two keyways 35 and 36 which are conveniently formed in diametrical alinement and when in registry with the respective slots 38 and 39 in the hub bearing 40 on said cover 3, said keyway 35 is adapted to receive the guard key 42 shown in Fig. X, and said keyway 36 is adapted to receive main keys such as the keys 43 and 44 shown in Figs. XI and XII. Each of said tumblers 12 has a projection 45 adapted to be engaged by the hook end 46 of the detent 47 which is pivoted on the stationary stud 48 and has the spring 49 bearing at its free end upon the casing 2 and tending to turn said detent 47 into engagement with said projections 45 on said tumblers 12 so as to detain the latter in locked position as shown in Fig. IV. Said detent 47 has the arm 51 extending in opposition to the arm 52 of the guard lever 54, so that when the latter which is fulcrumed on the stationary stud 55, is rocked from the position shown in Fig. IV to the position shown in Fig. V, by the projection 56 on the cam 32 encountering the shoulder 57 on said lever 54, said detent is released from the tumblers 12 to permit the latter to be turned by the main key into the unlocked position shown in Fig. VI in which the stump 10 enters the gatings 11 of said tumblers. Said guard lever 54 has the stump 58 adapted to enter the gatings 59 of the guard tumblers 60 which are pivoted on said stationary stud 48 and each provided with a spring 61 bearing at its free end upon said casing 2 and tending to turn said tumblers 60 into the position shown in Figs. IV and VI, in which position they are stopped by their projections 62 encountering said stump 58. Said guard lever 54 has the arm 64 carrying the stud 65 which is adapted to be encountered by the releasing tumbler 66 which is pivoted on said stationary stud 48 and has the spring 67 bearing at its free end upon said casing 2 and tending to turn said tumbler into the position shown in Fig. V. It may be observed that when said guard lever 54 is turned to the position shown in Fig. V its stud 65 encounters said releasing tumbler 66 so that said guard lever 54 may be released and restored to its normal position, shown in Figs. IV and VI, by downward movement of said releasing tumbler 66.

Said guard key 42 and main key 43 are used to manipulate said lock as follows:— The lock mechanism being in the position shown in Figs. I and IV; the guard key 42 is inserted in the keyway 35 in the hub 31 and the latter turned, clockwise, approximately sixty degrees, the shape of said recess 33 being such as to permit such movement of the cam 32 without shifting the bolt 1. Said key 42 is bitted so as to sweep the tumblers 60 into position to receive the stump 58 in their gatings 59 and to then turn said guard lever 54 into the position shown in Fig. V, by the projection 56 on the cam 32 encountering said shoulder 57 on said lever. Thereupon, said hub 31 being returned to its normal position shown in Figs. I and IV, and said key 42 being withdrawn, the lock is in condition to be operated to retract the bolt 1 by the main key 43 shown in Fig. XI. Said main key 43 being then inserted in the keyway 36 of the hub 31 the latter is turned, clockwise, from the position shown in Fig. V to the normal unlocked position, in which the bolt 1 projects from the casing 2 to the extent indicated by the dotted line 70 shown in Fig. VI. Said key 43 is bitted so as to sweep the tumblers 12 into position to receive the stump 10 in their gatings 11, thus permitting the cam 32 to turn to said unlocked position. However, it may be observed that said bolt 1 is shown abnormally retracted in Fig. VI, the abutment screw 8 having been withdrawn to permit said bolt to be retracted far enough to disengage the fence 18 from said tumblers 12 so that the latter may be changed to fit the key 44 shown in Fig. XII, or to fit any other suitable main key by inserting the same in the keyway 36 and turning it, clockwise, to sweep the tumblers 12 into the proper position to fit the bitting of the key. During such change, said tumblers 12 are pivotally supported, at their normally free ends, by the stump 10 in their gatings 11, so that the adjustment is effective at the pivotal ends of said tumblers. Thereupon, the bolt being restored to normal locked position, by the adjustment of the abutment screw 8, the gear teeth 20 on the fence 18 reëngage the gear teeth 16 on said tumblers 12, but in the changed position, the effect of the adjustment of said tumblers with respect to the newly selected main key being to shift their axes of oscillation relatively to the key sweep edges 17 of said tumblers and relatively to the casing 2.

It is to be understood that both of said groups of tumblers 12 and 60 are changeable to form different combinations requiring keys with correspondingly changed bittings to operate them. However, all of the tumblers 12 being of precisely the same shape the permutation thereof is limited by the number and arrangement of the gear teeth 16 and 20 and the dimensions of their slots 14 which permit the relative adjustment of said teeth. However, it is to be understood that the key sweep edges 17 of said tumblers 12 may be differently shaped to adapt locks, otherwise constructed as above described, to be operated by different series of main keys Moreover, it is to be understood that locks having the capacity for adjustment of the axes of oscillation of the tumblers in accordance with my invention, may be made without the guard mechanism above described. For instance, in the form of my invention shown in Figs. XIII, XIV and XV the lock bolt 71 is fitted to slide in the lock casing 72 and carries the stump 73 fitted to enter the gatings 74 of the tumblers 75 which are loosely supported on the stationary screw stud 77 extending through their slots 78 and have sectoral series of gear teeth 79 pivotally supported by the fence 80 which is constructed and may be operated like the fence 18 above described. Said bolt 71 and tumblers 75 are adapted to be operated by the rotary key hub 83 having the cam 84 and otherwise similar to the hub 31 but having only a single keyway 85. It is to be understood that such locks may be operated by main keys such as shown in Figs. XI and XII; Figs. XIII and XV showing the tumblers 75 adjusted for operation by respectively different keys.

It is to be understood that I do not desire to limit myself to the precise details of construction and arrangement herein set forth as it is obvious that various modifications may be made therein without departing from the essential features of my invention as defined in the appended claims.

I claim:—

1. In a changeable combination key lock, the combination with a casing; of a slide bolt; a rotary key hub with two separate keyways, respectively for a guard key and a main key; main tumbler mechanism arranged to detain and release said bolt in accordance with the position thereof, including a series of counterpart pivoted tumblers each having a sectoral series of gear teeth at its pivoted end and each independently adjustable at its pivoted end to change the combination; a pivoted fence having a sectoral series of gear teeth arranged to mesh with the gear teeth on all of said main tumblers; a projection on said fence, at its free end, in position to be encountered by said bolt when the latter is withdrawn so as to disengage said fence from the gear teeth of said tumblers and permit the latter to be changed; movable means normally holding said fence in operative position; guard tumbler mechanism arranged to detain and release said bolt in accordance with the position thereof, including a detent arranged to engage said main tumblers at their free ends, a guard lever in coöperative relation with said detent, and a series of pivoted guard tumblers arranged to detain and release said guard lever in accordance with the position thereof; whereby, a guard key and a main key are required to be successively inserted in the respective keyways in said key hub to turn the latter to open the lock, and said main tumblers are pivotally adjustable at one end with respect to said fence, and pivotally adjustable at the other end with respect to said detent, to change the lock to be operated by different main keys, while subject to operation by the same guard key, and without dissembling the lock mechanism or opening said casing.

2. In a changeable combination key lock, the combination with a casing; of a slide bolt; a rotary key hub with two separate keyways, respectively for a guard key and a main key; main tumbler mechanism arranged to detain and release said bolt in accordance with the position thereof, including a series of counterpart pivoted tumblers each having a sectoral series of gear teeth at its pivoted end and each independently adjustable at its pivoted end to change the combination; a pivoted fence having a sectoral series of gear teeth arranged to mesh with the gear teeth on all of said main tumblers; a projection on said fence, at its free end, in position to be encountered by said bolt when the latter is withdrawn so as to disengage said fence from the gear teeth of said tumblers and permit the latter to be changed; movable means normally holding said fence in operative position; guard tumbler mechanism arranged to detain and release said bolt in accordance with the position thereof, including a detent arranged to engage said main tumblers, and a series of pivoted guard tumblers arranged to detain and release said detent in accordance with the position thereof; whereby, a guard key and a main key are required to be successively inserted in the respective keyways in said key hub to turn the latter to open the lock, and said main tumblers are pivotally adjustable at one end with respect to said fence, and pivotally adjustable at the other end with respect to said detent, to change the lock to be operated by different main keys, while subject to operation by the same guard key, and without dissembling the lock mechanism or opening said casing.

3. In a changeable combination key lock, the combination with a casing; of a slide bolt; a rotary key hub; main tumbler mechanism arranged to detain and release said bolt in accordance with the position thereof, including a series of pivoted tumblers each having a series of gear teeth at its pivoted end and each independently adjustable at its pivoted end to change the combination; a pivoted fence having a series of gear teeth arranged to mesh with the gear teeth on said main tumblers; a projection on said fence, at its free end, in position to be encountered by said bolt when the latter is withdrawn so as to disengage said fence from the gear teeth of said tumblers and permit the latter to be changed; movable means normally holding said fence in operative position; guard tumbler mechanism arranged to detain and release said bolt in accordance with the position thereof, including a detent arranged to engage said main tumblers, and a series of pivoted guard tumblers arranged to detain and release said guard lever in accordance with the position thereof.

4. In a changeable combination key lock, the combination with a casing; of a slide bolt; a rotary key hub; main tumbler mechanism arranged to detain and release said bolt in accordance with the position thereof, including a series of pivoted tumblers each having a series of gear teeth at its pivoted end and each adjustable at its pivoted end to change the combination; a pivoted fence having a series of gear teeth arranged to mesh with the gear teeth on said main tumblers; means on said fence in position to be encountered by said bolt when the latter is withdrawn so as to disengage said fence from the gear teeth of said tumblers and permit the latter to be changed; movable means normally holding said fence in operative position; guard tumbler mechanism arranged to detain and release said bolt in accordance with the position thereof, including a detent arranged to engage said main tumblers, and a series of guard tumblers arranged to detain and release said guard lever in accordance with the position thereof.

5. In a changeable combination key lock, the combination with a casing; of a slide bolt; a rotary key hub; main tumbler mechanism arranged to detain and release said bolt in accordance with the position thereof, including a series of pivoted tumblers each having a series of gear teeth at its pivoted end and each adjustable at its pivoted end to change the combination; a pivoted fence having a series of gear teeth arranged to mesh with the gear teeth on said main tumblers; means on said fence in position to be encountered by said bolt when the latter is withdrawn so as to disengage said fence from the gear teeth of said tumblers and permit the latter to be changed; and movable means normally holding said fence in operative position.

6. In a changeable combination key lock, the combination with a slide bolt; of a series of counterpart pivoted tumblers arranged to detain and release said bolt in accordance with the position thereof, each having a sectoral series of gear teeth at its pivoted end and each independently adjustable at its pivoted end to change the combination; a pivoted fence having a sectoral series of gear teeth arranged to mesh with the gear teeth on all of said tumblers; a projection on said fence, at its free end, in position to be encountered by said bolt when the latter is withdrawn so as to disengage said fence from the gear teeth of said tumblers and permit the latter to be changed; and movable means normally holding said fence in operative position.

7. In a changeable combination key lock, the combination with a slide bolt; of a series of counterpart pivoted tumblers arranged to detain and release said bolt in accordance with the position thereof, each having a series of gear teeth at its pivoted end and each adjustable at its pivoted end to change the combination; a pivoted fence having a series of gear teeth arranged to mesh with the gear teeth on said tumbler; means on said fence in position to be encountered by said bolt when the latter is withdrawn so as to disengage said fence from the gear teeth of said tumblers and permit the latter to be changed; and movable means normally holding said fence in operative position.

8. In a changeable combination key lock, the combination with a slide bolt; of a series of pivoted tumblers arranged to detain and release said bolt in accordance with the position thereof, each having a series of gear teeth at its pivoted end and each adjustable at its pivoted end to change the combination; a pivoted fence having a series of gear teeth arranged to mesh with the gear teeth on said tumblers; means on said fence in position to be encountered by said bolt when the latter is withdrawn so as to disengage said fence from the gear teeth of said tumblers and permit the latter to be changed; and movable means normally holding said fence in operative position.

9. In a changeable combination lock, the combination with a slide bolt; of a series of pivoted tumblers arranged to detain and release said bolt in accordance with the position thereof, each having at one end a member capable of pivotal engagement and each adjustable at that end to change the combination; a fence having a series of members capable of pivotal engagement arranged to engage said tumbler members; means on said fence in position to be encountered by said bolt when the latter is withdrawn so as to disengage said fence from said members of said tumblers and permit the latter to be changed; and movable means normally holding said fence in operative position.

In testimony whereof, I have hereunto signed my name at Philadelphia, Pennsylvania, this sixth day of February, 1913.

EDWARD WILLEY MARVEL.

Witnesses:
ARTHUR E. PAIGE,
WM. H. HOLLAR, Jr.